March 16, 1937.   W. A. CHRYST   2,074,103
SHOCK ABSORBING SUSPENSION
Filed Aug. 22, 1934   3 Sheets-Sheet 1

INVENTOR
WILLIAM A. CHRYST
BY
ATTORNEYS

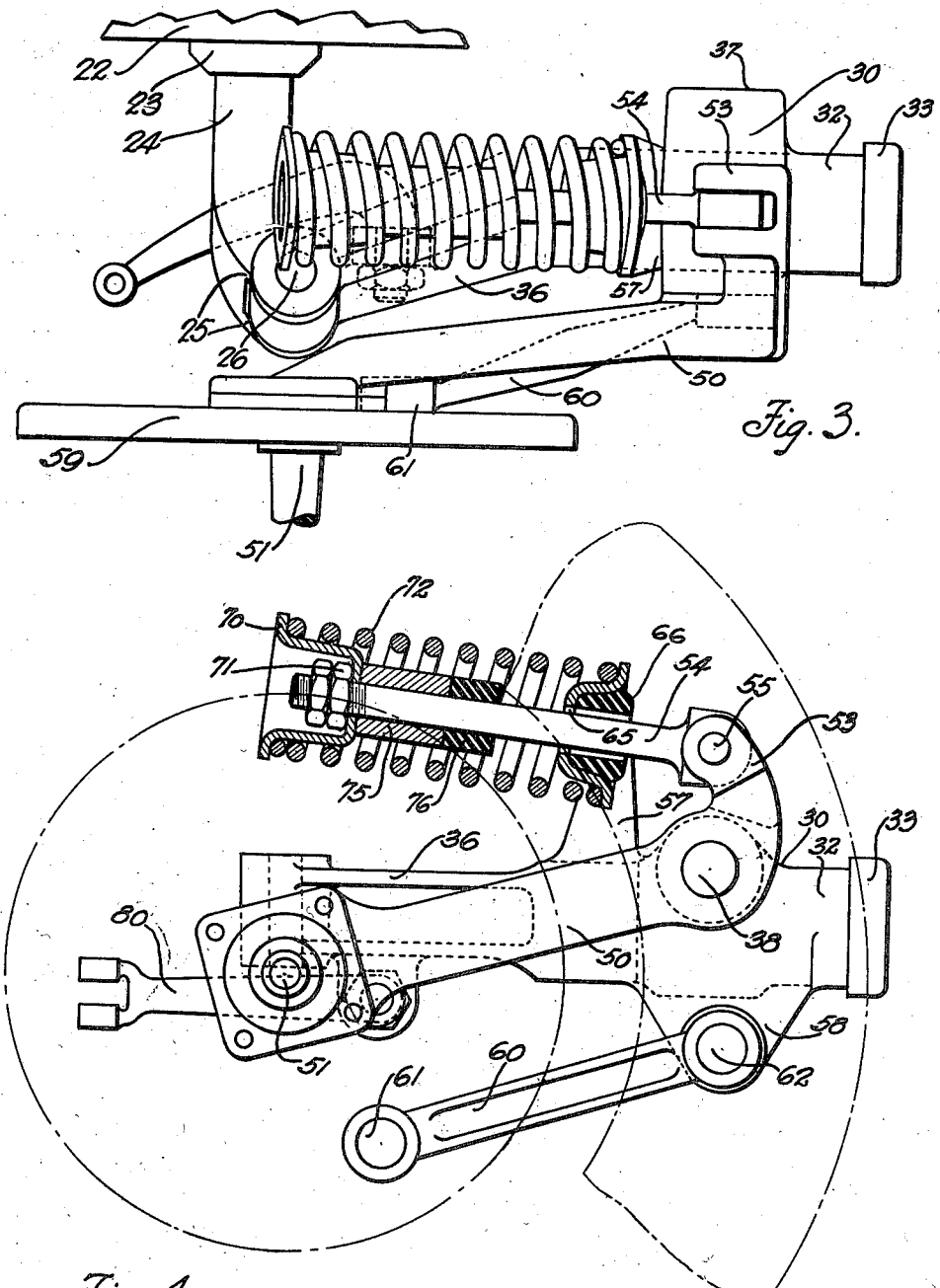

March 16, 1937.  W. A. CHRYST  2,074,103
SHOCK ABSORBING SUSPENSION
Filed Aug. 22, 1934  3 Sheets-Sheet 3

INVENTOR
WILLIAM A. CHRYST
BY
ATTORNEYS

Patented Mar. 16, 1937

2,074,103

UNITED STATES PATENT OFFICE 2,074,103

SHOCK ABSORBING SUSPENSION

William A. Chryst, Dayton, Ohio, assignor to General Motors Corporation, Detroit, Mich., a corporation of Delaware Application August 22, 1934, Serial No. 740,925

6 Claims. (Cl. 267—20)

This invention relates to improvements in individual wheel suspension devices for vehicles.

It is among the objects of the present invention to provide means for individually supporting each vehicle wheel to the vehicle frame, said means being of simple structure and design and requiring a minimum number of parts.

A further object of the present invention is to provide an individual wheel suspension comprising cushioning devices capable of controlling relative movements between the frame of the vehicle and the wheels attached thereto.

Further objects and advantages of the present invention will be apparent from the following description, reference being had to the accompanying drawings wherein a preferred embodiment of the present invention is clearly shown.

In the drawings:

Figure 3 is a fragmentary view showing the individual wheel suspension in a top plan view.

Figure 4 is a view taken substantially along the line 4—4 of Figure 1.

Figure 1:
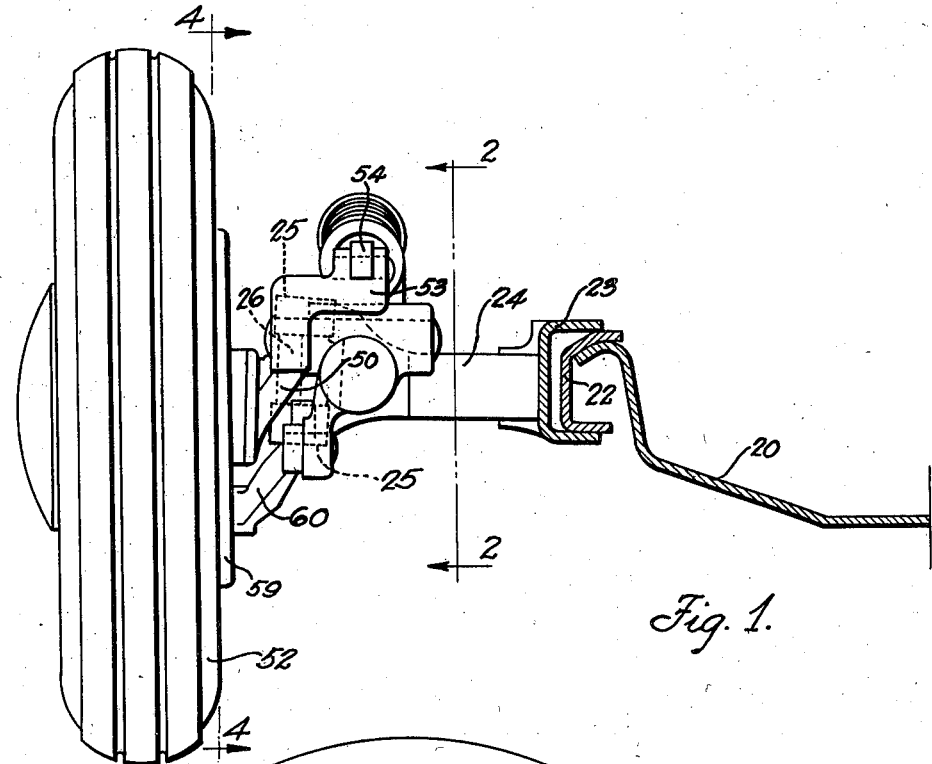
Figure 1 is a fragmentary front view showing the individual wheel suspension of the present invention secured to the side member of the vehicle frame.

Referring to the drawings and particularly to Figure 1, the numeral 20 designates a cross member of the frame to which the side member 22 is attached. Adjacent the front end of the frame, side member 22 has a bracket 23 secured thereto which bracket supports member 24 extending outwardly from the side member 22, as shown in Figure 3. The outer end of this member 24 is forked, as at 25, and as shown in dotted lines in Figure 1, this forked end member 24 supports the king pin 26.

The shock absorber in this instance comprises a casing 30 providing a fluid reservoir 31 and a cylinder 32, one end of which is closed by a cylinder head cap 33. The opposite end of this cylinder 32 has an extension 36. The end of this extension has an opening for receiving the king pin 26 carried by the member 24 so that the shock absorber casing 30 is hingedly secured to the side frame member 22 of the vehicle.

A transverse lug 37 on the shock absorber is bored out to provide a bearing for the shock absorber operating shaft 38. Inside the shock absorber casing 30 this shaft 38 has the shock absorber operating cam 39 provided thereon which engages the piston 40 slidably supported within the cylinder 32. This piston 40 is of ordinary type comprising two piston head portions 41 and 42, the piston head portion 41 forming the spring compression control chamber 43 while the piston head portion 42 forms the spring control rebound chamber 44 at the opposite end of the cylinder. Suitable fluid flow control devices are provided in the passages of the piston, which, under certain circumstances and in response to certain movements of the piston provide for a substantial free flow of the fluid into the respective displacement chambers and in response to other movements of the piston provide for a restricted flow of fluid from the respective displacement chambers.

The shaft 38 has one end extending outside the shock absorber casing and to this end arm 50 is attached. The point of attachment between arm 50 and shaft 38 is intermediate the ends of this arm, as shown in Figure 4. At the one end of arm 50 a spindle 51 is provided upon which a wheel 52 of the vehicle is mounted. The other end of the arm 50, this end being designated by the numeral 53, has one end of rod 54 hinged thereto, this hinge connection being made by the pin 55.

The shock absorber casing 30 has two lugs extending from opposite sides thereof, one being designated by the numeral 57, the other by the numeral 58. Upon the spindle 51 a disc 59 is supported so as to be movable rotatably relative thereto this disc 59 providing a backing plate for the braking mechanism of the vehicle wheel. This braking mechanism is not shown in the present drawings for it does not enter into the present invention. A link 60 has one end pivoted to the disc 59 as at 61, the other end being pivoted to the lug 58 of the shock absorber as at 62.

Lug 57 has an opening 65 through which rod 54 extends. A rubber grommet 66 fits into a cup-shaped portion of lug 57 and acts as a bumper adapted to be engaged by the end of rod 54 when the wheel supporting arm 50 moves to its one extreme position. The free end of rod 54 has an abutment cup 70 held in properly adjusted position on rod 54 by nuts 71 threadedly received by said free end of the rod. A coil spring 72 is provided about the rod 54, one end of said spring engaging the lug 57 on the shock absorber, the other end engaging the abutment cup 70 on the rod 54. This spring resiliently supports the vehicle frame. A spacing collar 75 having a rubber block 76 at its outer end is interposed between the lug 57 and the abutment cup 70 so that the rubber block 76 may engage the lug 57 and prevent noise and possible fracture when the wheel support arm 50 is moved to its extreme other position.

An arm 80 is attached to the shock absorber casing 30 in any suitable manner, this arm being adapted to have the steering mechanism of the vehicle attached thereto whereby the shock absorber and its wheel supporting arm 50 may be rotated about the king pin 26 for purposes of steering the vehicle.

Figure 2:
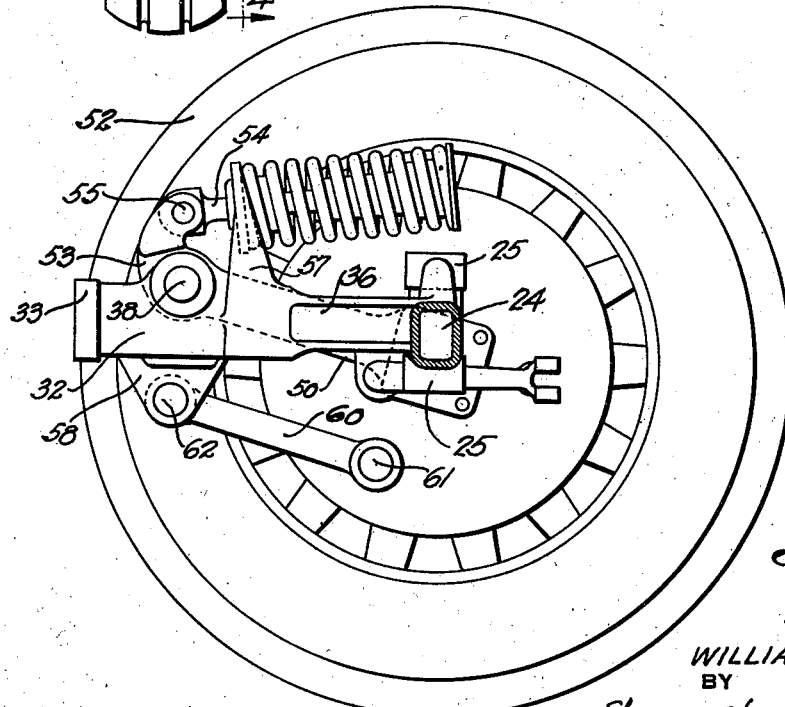
Figure 2 is a detailed side view taken substantially along the line 2—2 of Figure 1.
Figure 5:
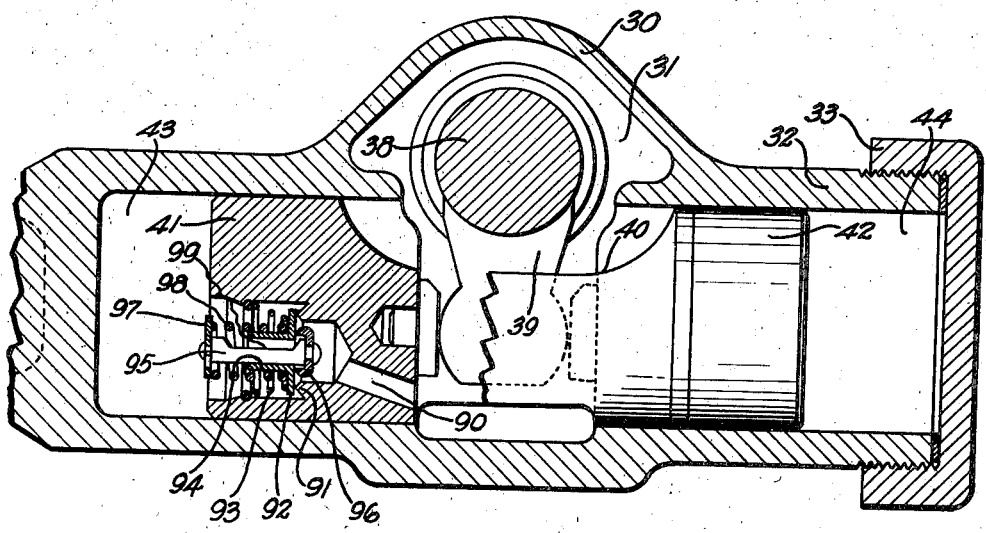
Figure 5 is an enlarged view partly in section showing the construction of the hydraulic shock absorber member of the suspension.

In order to understand more clearly the construction of the type of piston shown in the drawings a short detailed description of the fluid flow control device in one of the head members will be given. Referring particularly to Figure 5, the piston head member 41 is shown having a through passage 90 provided for the transfer of fluid from one side of the piston to the other. In this passage there is provided an annular valve seat 91 normally engaged by the intake valve 92 which is urged into engagement with the seat by spring 93. This valve has a cylindrical shape body portion 94 which slidably supports the stem 95 at one end of which the pressure release valve head 96 is attached. At the opposite end of the stem 95 an abutment collar 97 is provided, which abutment collar is engaged by one end of the spring 98, the opposite end thereof engaging valve 92. The spring 98 yieldably maintains the valve head 96 in engagement with the intake valve 92 so that normally a restricted flow of fluid through groove 99 in the valve stem 95 is prevented. It will be seen that when the piston moves toward the right as regards Figure 5 fluid in the reservoir 31 will move the entire valve assembly so that the intake valve 92 leaves its seat 91. In response to the opposite movement of the piston, pressure is exerted upon the fluid in chamber 43 which pressure when sufficient moves valve head 96 from engagement with the valve 92, thereby permitting a restricted fluid flow from chamber 43 past the valve head 96 and through passage 90 into the fluid reservoir 31. Restriction to this flow of fluid will naturally resist the movement of the piston exerting pressure upon the fluid within the respective displacement chambers. The device functions in the following manner: In response to the striking of an obstruction in the roadbed by the wheel 52, said wheel will be thrust upwardly causing the rod 50 upon which the wheel is mounted to be rotated clockwise with the shaft 38 of the shock absorber to which said arm is secured. This clockwise direction is taken as regards Figure 4, the rotation in Figure 2 being counterclockwise. Clockwise rotation of the shaft 38 would move the piston 40 toward the left as regards Figures 4 and 5. The same clockwise rotation of the arm 50 would cause its portion 53 to exert a pull upon rod 54 causing the spring 72 to be compressed. This movement of arm 50 in a clockwise direction is resisted in two ways: First, by the restriction of the flow of fluid from the chamber 43 past valve head 96 and piston passage 90 into the reservoir 31 and second, by the resistance of spring 72 to being compressed. As the wheel rides down the backside of the obstruction, or as a separating movement between the wheel 52 and the frame of the vehicle results, a reverse rotation of the arm obtains, namely, a counter-clockwise rotation as regards Figure 4, and a clockwise as regards Figure 2. This results in the piston 40 being moved to the right as regards Figure 5 exerting a pressure upon fluid in chamber 44, the flow therefrom being restricted by a valve in piston head 42 corresponding to valve 96 in the piston head 41.

From the aforegoing it will be seen that applicant has provided a shock absorber so constructed and arranged that it may be pivotally secured to the frame and that its operating shaft provides a support for the lever upon which the wheel is rotatably carried, the vehicle frame supporting spring being interposed between said arm and the shock absorber. Such a construction provides a device which may be sturdily built and requires substantially fewer parts as compared to some of the more intricate individual wheel suspensions known. The device is so constructed and arranged that the steering mechanism of the vehicle may be easily attached thereto to provide for vehicle steering. Practically all parts of the suspension device are carried by the shock absorber, therefore, making the design a very compact structure.

While the embodiment of the present invention as herein disclosed, constitutes a preferred form, it is to be understood that other forms might be adopted, all coming within the scope of the claims which follow.

What is claimed is as follows:

1. In a device of the character described, the combination with the frame of a vehicle; a hydraulic shock absorber comprising a housing providing a cylinder in which a piston forms fluid displacement chambers, said housing having an extension hinged to the frame; a shaft oscillatably carried by the shock absorber housing and having a member for operating the piston; an arm attached intermediate its ends to said shaft, one end of said arm providing a spindle for supporting a wheel of the vehicle; a lug extending from the shock absorber housing; a rod pivotally attached to the end of the arm opposite the spindle, said rod extending through an opening in the lug; and a coil spring about the rod, engaging the lug and an abutment member carried by the rod.

2. In a device of the character described the combination with the frame of a vehicle; a hydraulic shock absorber comprising a casing providing a cylinder having an extension pivotally secured to said frame, said cylinder having a reciprocatable piston; a shaft oscillatably carried transversely of the casing for actuating the piston; lugs extending from opposite sides of the casing; an arm secured intermediate its ends to said shaft and providing a wheel supporting spindle at its one end; a rod pivotally secured to the other end of the arm and extending through an opening in one of said lugs; a disc carried upon the wheel spindle so as to be movable rotatably relatively thereto; a spring about the rod interposed between the lug through which the rod extends and an abutment member on said rod; and a link having one end pivotally attached to the disc and the other end to the other lug on the shock absorber.

3. In a device of the character described, the combination with the frame of a vehicle; a hydraulic shock absorber comprising a casing and a fluid displacement member therein, said casing being pivotally secured to the frame; a rotatable shaft supported transversely of the shock absorber and being operatively connected to the displacement member for reciprocating it; an arm secured to the shaft, said arm having a wheel spindle and a disc provided at its free end; a suspension spring interposed between the arm and the casing of the shock absorber; and a link having its ends pivotally attached to the said casing and the disc respectively.

4. In a device of the character described, the combination with the frame of a vehicle; a hydraulic shock absorber comprising a casing and a fluid displacement member therein, said casing being pivotally secured to the frame; a rotatable shaft supported transversely of the shock absorber and being operatively connected to the displacement member for reciprocating it; an arm secured to the shaft, said arm having a wheel spindle and a disc provided at its free end; a suspension spring interposed between the arm and the casing of the shock absorber; and a link having its ends pivotally attached to the said casing and the disc respectively, said link being substantially parallel to the said arm.

5. In a device of the character described, the combination with the frame of a vehicle; a hydraulic shock absorber comprising a casing and a fluid displacement member therein, said casing being pivotally secured to the frame and having two oppositely disposed lugs extending therefrom; a rotatable shaft supported transversely of the shock absorber and being operatively connected to the displacement member for reciprocating it; an arm secured to the shaft, said arm having a wheel spindle and a disc provided at its free end; a suspension spring interposed between the arm and one of the lugs on the casing of the shock absorber; and a link having its ends pivotally attached to the other lug on the said casing and the disc respectively.

6. In a device of the character described, the combination with the frame of a vehicle; a hydraulic shock absorber comprising a casing and a fluid displacement member therein, said casing being pivotally secured to the frame and having one lug extending from one side of the casing and a second and third lug from the opposite side of the casing; a rotatable shaft supported transversely of the shock absorber and being operatively connected to the displacement member for reciprocating it; an arm secured to the shaft said arm having a wheel spindle and a disc provided at its free end; a suspension spring interposed between the arm and the one lug extending from the one side of the casing of the shock absorber; a link having its ends pivotally attached to the second lug extending from the said casing and the disc respectively; and a steering arm rigidly secured to the third lug on the casing.

WILLIAM A. CHRYST.